United States Patent
Koch et al.

(10) Patent No.: US 6,939,124 B2
(45) Date of Patent: Sep. 6, 2005

(54) LOCKING UNIT OF A THREE-PLATE INJECTION-MOLDING MACHINE

(75) Inventors: Michael Koch, Freiburg (DE); Kai Grundmann, Denzlingen (DE)

(73) Assignee: Ferromatik Milacron Maschinenbau GmbH, Malterdinger (DE)

( * ) Notice: Subject to any disclaimer, the term of this patent is extended or adjusted under 35 U.S.C. 154(b) by 0 days.

(21) Appl. No.: 10/780,538

(22) Filed: Feb. 17, 2004

(65) Prior Publication Data

US 2004/0191360 A1 Sep. 30, 2004

Related U.S. Application Data

(63) Continuation of application No. PCT/EP02/09102, filed on Aug. 14, 2002.

(51) Int. Cl.[7] .............................................. B29C 45/83
(52) U.S. Cl. ...................... 425/593; 425/107; 425/151; 425/210
(58) Field of Search ....................... 425/73, 107, 151, 425/210, 451.6, 593, DIG. 45

(56) References Cited

U.S. PATENT DOCUMENTS

| | | | |
|---|---|---|---|
| 3,508,300 A | | 4/1970 | Allard et al. |
| 3,728,057 A | * | 4/1973 | Grundmann et al. ........ 425/151 |
| 3,997,286 A | * | 12/1976 | Gabrys ................... 425/405.1 |
| 4,382,763 A | * | 5/1983 | Hehl ......................... 425/153 |
| 4,921,419 A | * | 5/1990 | Brussel ................... 425/450.1 |
| 5,297,953 A | | 3/1994 | Wang |

FOREIGN PATENT DOCUMENTS

| | | |
|---|---|---|
| EP | 0 931 974 | 7/1999 |
| JP | 64-009714 | 1/1989 |
| JP | 64-038215 | 2/1989 |
| JP | 6-55578 | * 3/1994 |

* cited by examiner

*Primary Examiner*—James P. Mackey
(74) *Attorney, Agent, or Firm*—Katten Muchin Rosenman LLP

(57) ABSTRACT

The closing unit of a three-plate injection-molding machine comprises a die plate (1), a movable mold-clamping plate (2) and an end plate (3). Therein the die plate (1) and the end plate (3) are connected to one another via tie bars (4) on which the movable mold-clamping plate (2) is displaceably guided, and a toggle-lever arrangement (5), on which a drive unit (6) acts is provided between the end plate (3) and the movable mold-clamping plate (2). An encasing element (13) of variable length extends between the end plate (3) and the movable mold-clamping plate (2).

7 Claims, 4 Drawing Sheets

LOCKING UNIT OF A THREE-PLATE INJECTION-MOLDING MACHINE

CROSS-REFERENCE TO RELATED APPLICATION

Figure 1:
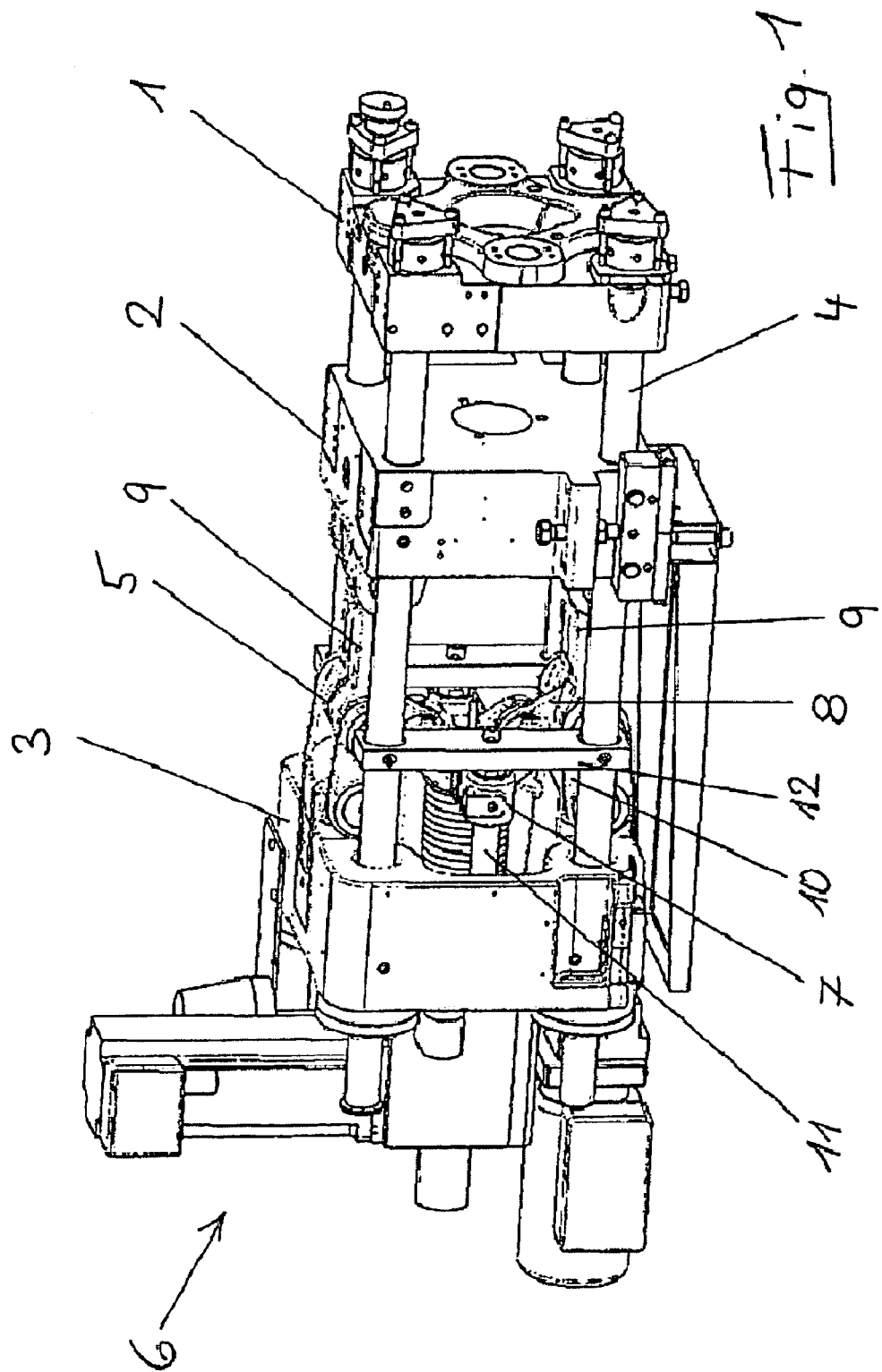

The present application is a continuation of International Application No. PCT/EP02/09102 which was filed on Aug. 14, 2002.

The present invention relates to a closing unit of a three-plate injection-molding machine comprising a die plate, a movable mold-clamping plate and an end plate, wherein the die plate and the end plate are connected to one another via tie bars on which the movable mold-clamping plate is displaceably guided, and wherein a toggle-lever arrangement on which a drive unit acts is provided between the end plate and the movable mold-clamping plate.

Closing units of the type indicated in the foregoing are known by virtue of their use in commercial injection-molding machines. European Patent 0650817 A1 also discloses a closing unit of the type mentioned in the introduction.

Compared with hydraulic closing units, mechanical closing units having a toggle-lever arrangement are characterized in particular by a particularly favorable relationship between closing movement and closing force. This feature is a result of suitable structural design of the toggle-lever arrangement, wherein the possible closing force increases faster than proportionally toward the end of the closing movement, with a correspondingly reduced speed of closing movement. This permits comparatively high closing forces with drive units of relatively small dimensions for the closing unit. Despite this enormous advantage, the users nevertheless have some reservations about injection-molding machines having closing units of the type mentioned in the introduction, especially if it is planned to use the injection-molding machine for production of contamination-sensitive products such as CDs and DVDs.

Accordingly, the object of the present invention is to provide a closing unit that belongs to the class in question and that, with the minimum possible additional complexity compared with known closing units, permits the use of injection-molding machines equipped therewith even for production of injection-molded products having high sensitivity to contamination.

This object is achieved according to the present invention by the fact that an encasing element of variable length extends between the end plate and the movable mold-clamping plate in a closing unit of the type mentioned in the introduction. In other words, the inventive closing unit is characterized in that the toggle-lever arrangement is enclosed by an encasing element, which is connected at one end to the end plate and at the other end to the movable mold-clamping plate, and which is designed to have variable length in order to compensate for the varying distance between the end plate and the movable mold-clamping plate. Such an inventively provided encasing element has favorable effects in many respects. In particular, it can be emphasized that the encasing element is suitable for controlling and/or decisively reducing, in the immediate vicinity of the injection-molding machine, air swirls that can be caused by the rapid movement of the various components of the toggle-lever arrangement and that can stir up the smallest particles in the immediate vicinity of the injection-molding machine. Furthermore, the inventively provided encasing element effectively prevents the oil mist that can be formed in the region of the knuckle joints of oil-lubricated toggle-lever arrangements, of the type in widespread use for high-speed injection-molding machines, from reaching the vicinity of the injection-molding machine. Not only does the encasing element contribute to improving the quality of the injection-molded products by the fact that it holds back oil mist of such nature; it also represents an effective means for countering the exposure and possible health impairment of the person operating the injection-molding machine in question. Furthermore, especially in the case of relatively large quantities of trapped oil mist, recovery and perhaps—after appropriate conditioning—reuse is also possible; this is particularly favorable from environmental viewpoints.

A further advantage of the present invention is to be seen in the fact that it opens up new possibilities for lubricating the toggle-lever arrangement with pressurized oil. In particular, the present invention makes it possible to depart from the present tendency of longer lubrication intervals with larger lubricating-oil quantities in favor of shorter lubrication intervals with smaller lubricating-oil quantities. In particularly different cases, it is even possible to think of switching from intermittent lubrication to continuous lubrication by oil circulation.

According to a first preferred improvement, the inventively provided encasing element is constructed as a bellows. A substantial advantage of this improvement is the particularly low moving masses. In addition, reliable leadtightness of the encasing element can be assured here if necessary with minimum complexity.

Another equally preferred improvement of the invention is characterized in that the encasing element is constructed as a lining comprising at least two tunnel-like sheet-metal parts that can be displaced telescopically relative to one another. For this purpose the smooth surface finish that is possible for the lining proves to be advantageous.

According to another preferred improvement of the invention, the encasing element has an open structure in its lower region. In this case the lower opening of the encasing element can be disposed in particular above a collecting trough. The oil mist trapped by the encasing element is then fed to each collecting trough. Obviously this is favorable regardless of whether the encasing element is constructed as a bellows, metal-sheet lining or other encasing element. In this case it is particularly preferred to provide, in the region of the opening of the encasing element, flow-guiding plates that can selectively influence the flow direction and other flow conditions of the air volume that enters the encasing element during closing of the closing unit and/or of the air volume that exits the encasing element during opening of the closing unit.

The downwardly open construction of the encasing element explained in the foregoing is indeed generally adequate and at the same time particularly favorable; nevertheless, it is by no means imperative. To the contrary, it is also entirely conceivable, in the scope of the present invention, that the encasing element can be provided in a form that is closed on all sides with a bottom drain for trapped oil mist and a well-defined air inlet for ventilation of the space enclosed by the encasing element. This construction suggests itself in particular when the most stringent requirements are imposed on the quality of the injection-molded products.

According to yet another preferred improvement of the invention, the encasing element is braced on the tie bars between the end plate and the movable mold-clamping plate. With such bracing, the requirements as to inherent stiffness of the encasing element can be relaxed, and so this element can be of comparatively lightweight construction. This in turn is advantageous with regard to the moving masses and to the ease of maintenance of the injection-molding machine equipped with the inventive closing unit.

The length variability of the inventively provided encasing element is preferably limited to a partial region of its length. In this way it is possible in particular to provide that, in the case of construction of the encasing element as a sheet-metal lining, the sheet-metal part connected to the movable mold-clamping plate is only slightly larger in the direction of movement than is the maximum travel of the movable mold-clamping plate. This in turn contributes to keeping the moving masses as small as possible.

Figure 2:
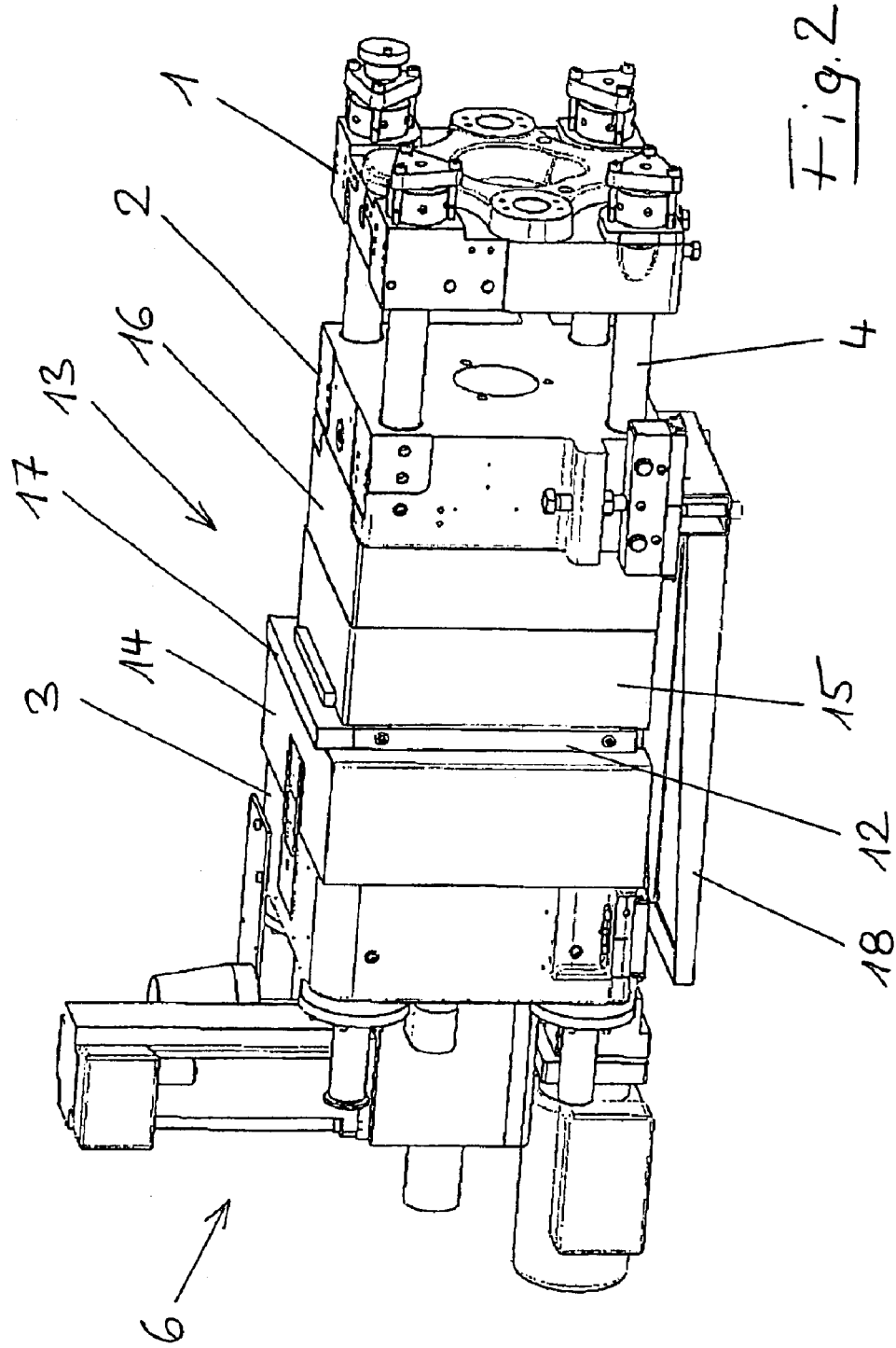
Figure 3:
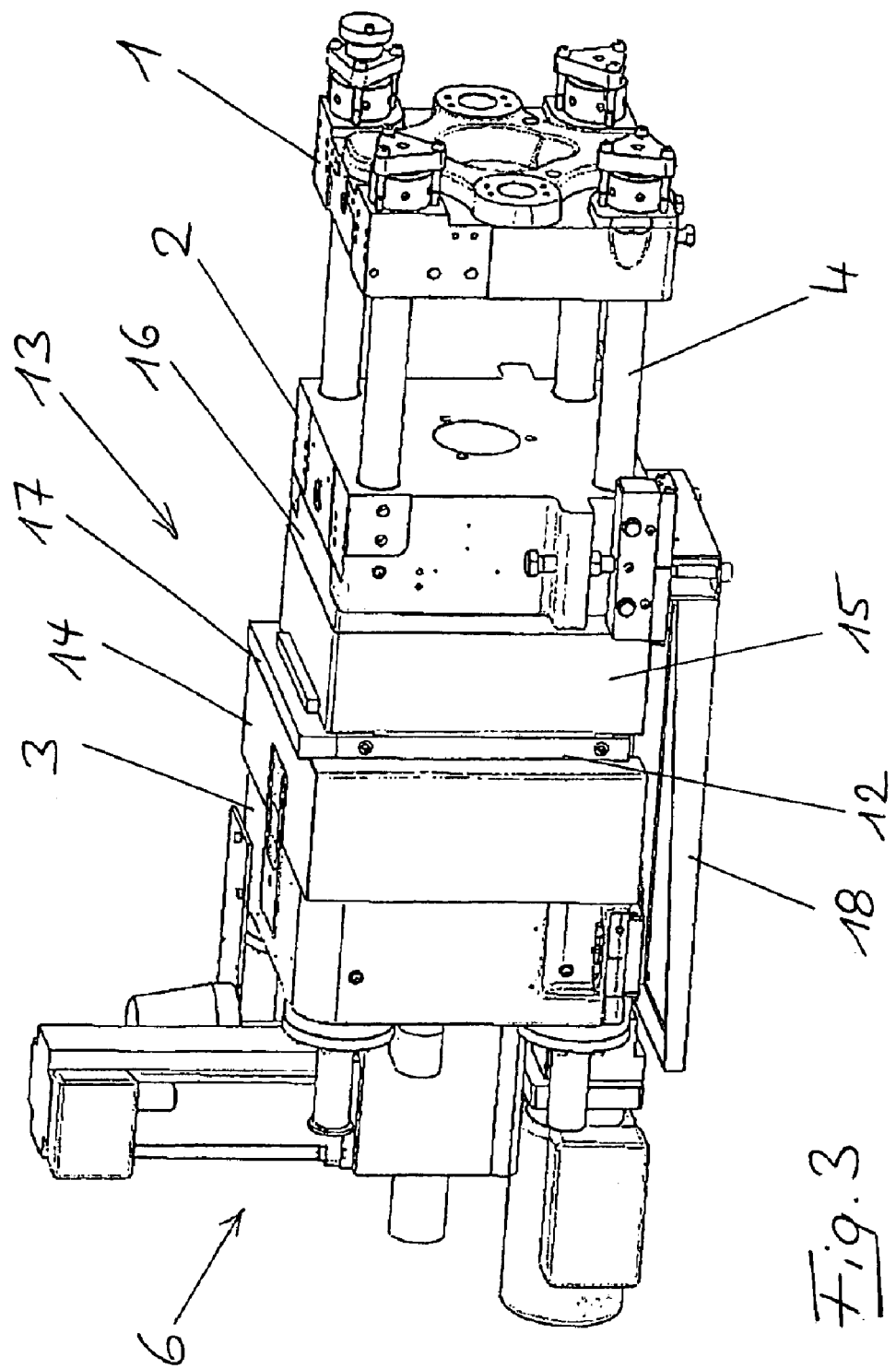

The present invention will be explained in more detail hereinafter on the basis of a preferred particle example illustrated in the drawing, wherein FIG. 1 shows a perspective view of a prior art closing unit in its closed position, FIG. 2 shows a perspective view of a closing unit according to the present invention in its closed position, and FIG. 3 shows a perspective view of the closing unit according to FIG. 2 in its open position.

Figure 4:
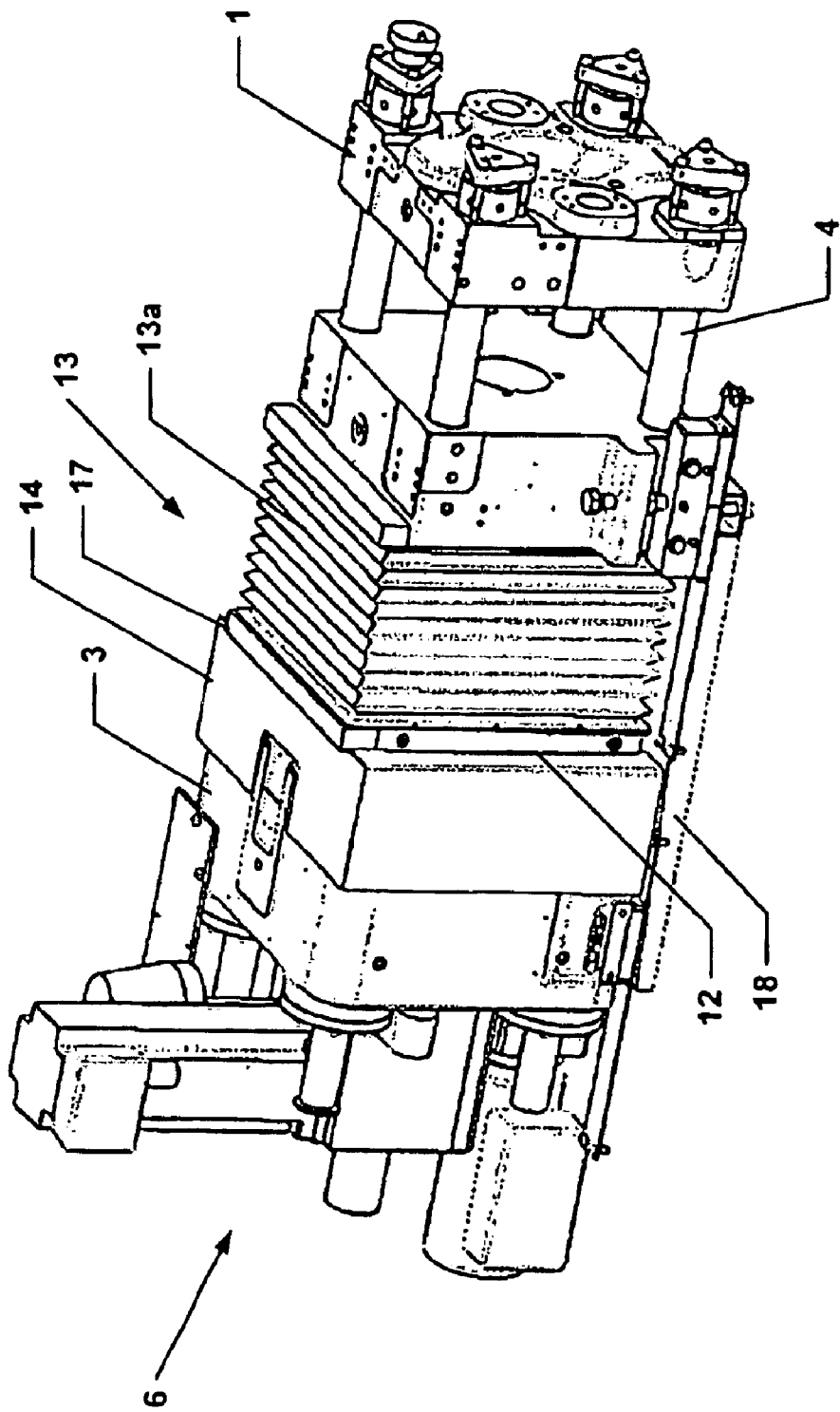

FIG. 4 shows a perspective view of the closing unit according to the present invention in its closed position, wherein the encasing unit is constructed as a bellows.

The closing unit corresponding to the prior art and illustrated in FIG. 1 comprises in a manner known in itself three plates, namely a die plate 1, a movable mold-clamping plate 2 and an end plate 3. End plate 3 is rigidly connected to die plate 2 via four tie bars 4. Movable mold-clamping plate 2 is guided displaceably on those tie bars 4. This displacement of movable mold-clamping plate 2 is effected by a toggle-lever arrangement 5, which is disposed between movable mold-clamping plate 2 and end plate 3. Toggle-lever arrangement 5 is provided with a drive unit 6, which acts via knuckle-joint head 7 and intermediate link 8 connected thereto on links 9 and 10 of toggle-lever arrangement 5. This knuckle-joint head 7 is guided on two guide tie bars 11, which are fastened at one end in end plate 3 and at the other end in respective crosspieces 12, each of which is fixed to two tie bars 4.

In this respect and also in the scope of further details not explained in the foregoing, both the known closing unit according to FIG. 1 and the inventive closing unit according to FIGS. 2 and 3 correspond to the prior art, and so further explanations are not necessary.

The practical example, illustrated in FIGS. 2 and 3, of a closing unit according to the present invention differs from the closing unit according to FIG. 1 by an encasing element 13 enclosing toggle-lever arrangement 5. In those cases, encasing element 13 is constructed as a lining that is closed on three sides but open in its lower region. It comprises three tunnel-like sheet-metal parts, namely a first sheet-metal part 14, which is connected at one end to end plate 3 and at the other end to the two crosspieces 12, a second sheet-metal part 15, which at the end opposite sheet-metal part 14 is connected integrally to the two crosspieces 12, and a third sheet-metal part 16, which is connected integrally to movable mold-clamping plate 2. The aforesaid latter two sheet-metal parts 15 and 16 can be displaced telescopically relative to one another, sheet-metal part 16 connected to movable mold-clamping plate 2 being guided sealingly in sheet-metal part 16 connected to crosspieces 12.

Encasing element 13 also comprises a sealing strip 17, which extends between the upper ends of the two crosspieces 12 and bridges the gap between the two sheet-metal parts 14 and 15. The fastening means for the individual sheet-metal parts 14, 15 and 16 to the associated components of the closing unit are chosen such that the sheet-metal parts can be removed with little effort in order to perform maintenance tasks.

The lower opening of encasing element 13 is disposed above a collecting trough 18, from which particles and droplets trapped by the encasing element and then falling down are removed at regular intervals.

According to a preferred improvement shown in FIG. 4, the inventively provided encasing element 13 is constructed as a bellows 13a.

What is claimed is:

1. A closing unit of a three-plate injection-molding machine comprising a die plate, a movable mold-clamping plate and an end plate, wherein the die plate and the end plate are connected to one another via tie bars on which the movable mold-clamping plate is displaceably guided, and wherein a toggle-lever arrangement on which a drive unit acts is provided between the end plate and the movable mold-clamping plate, characterized in that an encasing element of variable length extends between the end plate and the movable mold-clamping plate.

2. A closing unit according to claim 1, characterized in that the encasing unit is constructed as a bellows.

3. A closing unit according to claim 1, characterized in that the encasing element is constructed as a lining comprising at least two tunnel-like sheet-metal parts that can be displaced telescopically relative to one another.

4. A closing unit according to claim 1, characterized in that the encasing element has an open structure in its lower region.

5. A closing unit according to claim 4, characterized in that a lower opening of the encasing element is disposed above a collecting trough.

6. A closing unit according to claim 1, characterized in that the encasing element is braced by the tie bars between the end plate and the movable mold-clamping plate.

7. A closing unit according to claim 1, characterized in that the length variability of the encasing element is limited to a partial region of its length.

* * * * *